US012688503B2

(12) United States Patent　(10) Patent No.: US 12,688,503 B2
Tseselsky et al.　(45) Date of Patent: Jul. 21, 2026

(54) SYSTEM, METHOD, AND COMPUTER PROGRAM PRODUCT FOR NETWORK MESSAGE AUGMENTATION

(71) Applicant: Visa International Service Association, San Francisco, CA (US)

(72) Inventors: David Tseselsky, San Jose, CA (US); Louis M.S. Champion, Henfield (GB); Galileo L. Olmos, Belmont, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 18/847,452

(22) PCT Filed: Jun. 9, 2023

(86) PCT No.: PCT/US2023/024901
§ 371 (c)(1),
(2) Date: Sep. 16, 2024

(87) PCT Pub. No.: WO2023/244501
PCT Pub. Date: Dec. 21, 2023

(65) Prior Publication Data
US 2025/0209455 A1　Jun. 26, 2025

Related U.S. Application Data

(60) Provisional application No. 63/352,349, filed on Jun. 15, 2022.

(51) Int. Cl.
*G06Q 20/40*　(2012.01)
*G06Q 20/38*　(2012.01)
*G06Q 20/42*　(2012.01)

(52) U.S. Cl.
CPC ......... *G06Q 20/401* (2013.01); *G06Q 20/389* (2013.01); *G06Q 20/42* (2013.01)

(58) Field of Classification Search
CPC ..... G06Q 20/401; G06Q 20/389; G06Q 20/42
(Continued)

(56) References Cited

U.S. PATENT DOCUMENTS

2007/0012763 A1　1/2007　Van de Velde et al.
2009/0070171 A1 *　3/2009　Patterson ............. G06Q 20/385
705/42

(Continued)

*Primary Examiner* — Courtney P Jones
(74) *Attorney, Agent, or Firm* — The Webb Law Firm

(57) ABSTRACT

Systems, methods, and computer program products are provided for processing a payment transaction over an electronic network. The method includes receiving an authorization request message, including first transaction data associated with an electronic payment transaction and generating a unique identifier associated with the electronic payment transaction. The method further includes receiving an authorization response message, including second transaction data associated with the electronic payment transaction, indicating that the electronic payment transaction is authorized. The method further includes storing a portion of the first transaction data and the second transaction data in association with the unique identifier for the electronic payment transaction. The method further includes transmitting a response message comprising the unique identifier and the authorization decision and receiving a clearing request message comprising the unique identifier. The method further includes retrieving the stored transaction data and initiating clearing of the electronic payment transaction.

9 Claims, 4 Drawing Sheets

200

202 Receive an authorization request message

204 Generate a unique identifier

206 Receive an authorization response message

208 Store transaction data

210 Transmit a response message

212 Receive a clearing request message

214 Retrieve the stored transaction data

216 Initiate clearing of the electronic payment transaction

(58) Field of Classification Search
USPC ........................................................... 705/64
IPC ............................. G06Q 20/401,20/389, 20/42
See application file for complete search history.

(56) References Cited

U.S. PATENT DOCUMENTS

| | | | |
|---|---|---|---|
| 2012/0310838 A1 | 12/2012 | Harris et al. | |
| 2013/0268333 A1 | 10/2013 | Ovick et al. | |
| 2014/0188710 A1* | 7/2014 | Basu ..................... | G06Q 20/023 |
| | | | 705/39 |
| 2016/0027012 A1* | 1/2016 | Patterson ........... | G06Q 30/0215 |
| | | | 705/44 |
| 2016/0307196 A1 | 10/2016 | Achhra et al. | |
| 2017/0364878 A1 | 12/2017 | Malhotra et al. | |

* cited by examiner

200

300

1

SYSTEM, METHOD, AND COMPUTER PROGRAM PRODUCT FOR NETWORK MESSAGE AUGMENTATION

CROSS-REFERENCE TO RELATED APPLICATIONS

This application is the United States national phase of International Patent Application No. PCT/US23/24901 filed on Jun. 9, 2023, and claims priority to U.S. Provisional Patent Application No. 63/352,349, filed on Jun. 15, 2022, the disclosures of which are hereby incorporated by reference in their entireties.

BACKGROUND

1. Technical Field

This disclosure relates generally to processing a payment transaction over an electronic payment processing network and, in some non-limiting embodiments or aspects, to systems, methods, and computer program products for network message augmentation for processing a payment transaction over an electronic payment processing network.

2. Technical Considerations

In an electronic payment processing network, an acquirer system of an acquirer (e.g., a bank) may process payment transactions by communicating with a transaction processing system of a transaction service provider. Processing of the payment transactions may involve authorizing, clearing, and settling the payment transactions. In existing systems, the clearing step requires acquirer systems to store, match, and communicate transaction data via a clearing request to the transaction processing system for each transaction to be cleared. This involves the storage, matching, and communication of large amounts of transaction data (e.g., potentially hundreds of data elements) for each transaction.

Due to the complexity involved with generating the clearing request, existing acquirer systems process transactions for clearing using batch processing (e.g., a large group of transactions), the processing of the batch occurring at the end of each day. Batch processing does not allow acquirer systems to process transactions in real time or near real-time (e.g., relative to the transmission of a response message from the transaction processing system). It also requires the acquirer systems to expend significant computing resources in order to generate and communicate clearing requests.

SUMMARY

Accordingly, provided are improved systems, methods, and computer program products for processing a payment transaction over an electronic payment processing network.

According to non-limiting embodiments or aspects, provided is a computer-implemented method for processing a payment transaction over an electronic payment processing network. In some non-limiting embodiments or aspects, the method may include receiving, by a transaction processing system, an authorization request message associated with an electronic payment transaction from an acquirer system, the authorization request message may include first transaction data associated with the electronic payment transaction. In some non-limiting embodiments or aspects, the method may further include generating, by the transaction processing system, a unique identifier associated with the electronic payment transaction. In some non-limiting embodiments or aspects, the method may further include receiving, by the transaction processing system, an authorization response message associated with the electronic payment transaction from an issuer system, the authorization response message may include second transaction data associated with the electronic payment transaction, the second transaction data including an authorization decision indicating that the electronic payment transaction is authorized. In some non-limiting embodiments or aspects, the method may further include storing, by the transaction processing system, at least a portion of the first transaction data and the second transaction data in association with the unique identifier for the electronic payment transaction. In some non-limiting embodiments or aspects, the method may further include transmitting, by the transaction processing system, a response message including the unique identifier and the authorization decision to the acquirer system. In some non-limiting embodiments or aspects, the method may further include receiving, by the transaction processing system, a clearing request message including the unique identifier associated with the electronic payment transaction from the acquirer system. In some non-limiting embodiments or aspects, the method may further include, in response to receiving the clearing request message, retrieving, by the transaction processing system, the stored at least a portion of the first transaction data and the second transaction data associated with the unique identifier from the clearing request message. In some non-limiting embodiments or aspects, the method may further include initiating, by the transaction processing system, clearing of the electronic payment transaction based on the retrieved at least a portion of the first transaction data and the second transaction data associated with the unique identifier.

In some non-limiting embodiments or aspects, the method may further include transmitting, by the transaction processing system, the authorization request message to an issuer system, where the issuer system generates the authorization decision.

In some non-limiting embodiments or aspects, the clearing request message may include only the unique identifier associated with the electronic payment transaction.

In some non-limiting embodiments or aspects, the clearing request message may include only the unique identifier associated with the electronic payment transaction and updated first and/or second transaction data.

In some non-limiting embodiments or aspects, the clearing request message may not include transaction data associated with transactions other than the electronic payment transaction.

In some non-limiting embodiments or aspects, the clearing request message may be received by the transaction processing system in real-time or near real-time relative to transmission of the response message.

In some non-limiting embodiments or aspects, the at least a portion of the first transaction data and the second transaction data stored by the transaction processing system in association with the unique identifier for the electronic payment transaction may include all transaction data required to clear the electronic payment transaction.

According to non-limiting embodiments or aspects, provided is a system including: at least one processor; and at least one non-transitory computer-readable medium storing instructions that, when executed by the at least one processor, cause the at least one processor to receive an authorization request message associated with an electronic payment transaction from an acquirer system, where the authorization request message includes first transaction data associated with the electronic payment transaction. In some non-limiting embodiments or aspects, the instructions may further cause the at least one processor to generate a unique identifier associated with the electronic payment transaction. In some non-limiting embodiments or aspects, the instructions may further cause the at least one processor to receive an authorization response message associated with the electronic payment transaction from an issuer system, where the authorization response message includes second transaction data associated with the electronic payment transaction, the second transaction data including an authorization decision indicating that the electronic payment transaction is authorized. In some non-limiting embodiments or aspects, the instructions may further cause the at least one processor to store at least a portion of the first transaction data and the second transaction data in association with the unique identifier for the electronic payment transaction. In some non-limiting embodiments or aspects, the instructions may further cause the at least one processor to transmit a response message including the unique identifier and the authorization decision to the acquirer system. In some non-limiting embodiments or aspects, the instructions may further cause the at least one processor to receive a clearing request message including the unique identifier associated with the electronic payment transaction from the acquirer system. In some non-limiting embodiments or aspects, the instructions may further cause the at least one processor to, in response to receiving the clearing request message, retrieve the stored at least a portion of the first transaction data and the second transaction data associated with the unique identifier from the clearing request message. In some non-limiting embodiments or aspects, the instructions may further cause the at least one processor to initiate clearing of the electronic payment transaction based on the retrieved at least a portion of the first transaction data and the second transaction data associated with the unique identifier.

In some non-limiting embodiments or aspects, the instructions may further cause the at least one processor to transmit the authorization request message to an issuer system, where the issuer system generates the authorization decision.

In some non-limiting embodiments or aspects, the clearing request message may include only the unique identifier associated with the electronic payment transaction.

In some non-limiting embodiments or aspects, the clearing request message may include only the unique identifier associated with the electronic payment transaction and updated first and/or second transaction data.

In some non-limiting embodiments or aspects, the clearing request message may not include transaction data associated with transactions other than the electronic payment transaction.

In some non-limiting embodiments or aspects, the clearing request message may be received by the transaction processing system in real-time or near real-time relative to transmission of the response message.

In some non-limiting embodiments or aspects, the at least a portion of the first transaction data and the second transaction data stored by the transaction processing system in association with the unique identifier for the electronic payment transaction may include all transaction data required to clear the electronic payment transaction.

According to non-limiting embodiments or aspects, provided is a computer program product including at least one non-transitory computer-readable medium including program instructions that, when executed by at least one processor, cause the at least one processor to receive an authorization request message associated with an electronic payment transaction from an acquirer system, where the authorization request message includes first transaction data associated with the electronic payment transaction. In some non-limiting embodiments or aspects, the program instructions may further cause the at least one processor to generate a unique identifier associated with the electronic payment transaction. In some non-limiting embodiments or aspects, the program instructions may further cause the at least one processor to receive an authorization response message associated with the electronic payment transaction from an issuer system, where the authorization response message includes second transaction data associated with the electronic payment transaction, the second transaction data including an authorization decision indicating that the electronic payment transaction is authorized. In some non-limiting embodiments or aspects, the program instructions may further cause the at least one processor to store at least a portion of the first transaction data and the second transaction data in association with the unique identifier for the electronic payment transaction. In some non-limiting embodiments or aspects, the program instructions may further cause the at least one processor to transmit a response message including the unique identifier and the authorization decision to the acquirer system. In some non-limiting embodiments or aspects, the program instructions may further cause the at least one processor to receive a clearing request message including the unique identifier associated with the electronic payment transaction from the acquirer system. In some non-limiting embodiments or aspects, the program instructions may further cause the at least one processor to, in response to receiving the clearing request message, retrieve the stored at least a portion of the first transaction data and the second transaction data associated with the unique identifier from the clearing request message. In some non-limiting embodiments or aspects, the program instructions may further cause the at least one processor to initiate clearing of the electronic payment transaction based on the retrieved at least a portion of the first transaction data and the second transaction data associated with the unique identifier.

In some non-limiting embodiments or aspects, the program instructions may further cause the at least one processor to transmit the authorization request message to an issuer system, where the issuer system generates the authorization decision.

In some non-limiting embodiments or aspects, the clearing request message may include only the unique identifier associated with the electronic payment transaction.

In some non-limiting embodiments or aspects, the clearing request message may include only the unique identifier associated with the electronic payment transaction and updated first and/or second transaction data.

In some non-limiting embodiments or aspects, the clearing request message may not include transaction data associated with transactions other than the electronic payment transaction.

In some non-limiting embodiments or aspects, the clearing request message may be received by the transaction processing system in real-time or near real-time relative to transmission of the response message.

In some non-limiting embodiments or aspects, the at least a portion of the first transaction data and the second transaction data stored by the transaction processing system in association with the unique identifier for the electronic payment transaction may include all transaction data required to clear the electronic payment transaction.

Other non-limiting embodiments or aspects will be set forth in the following numbered clauses:

Clause 1: A method comprising: receiving, by a transaction processing system, an authorization request message associated with an electronic payment transaction from an acquirer system, wherein the authorization request message comprises first transaction data associated with the electronic payment transaction; generating, by the transaction processing system, a unique identifier associated with the electronic payment transaction; receiving, by the transaction processing system, an authorization response message associated with the electronic payment transaction from an issuer system, wherein the authorization response message comprises second transaction data associated with the electronic payment transaction, the second transaction data comprising an authorization decision indicating that the electronic payment transaction is authorized; storing, by the transaction processing system, at least a portion of the first transaction data and the second transaction data in association with the unique identifier for the electronic payment transaction; transmitting, by the transaction processing system, a response message comprising the unique identifier and the authorization decision to the acquirer system; receiving, by the transaction processing system, a clearing request message comprising the unique identifier associated with the electronic payment transaction from the acquirer system; in response to receiving the clearing request message, retrieving, by the transaction processing system, the stored at least a portion of the first transaction data and the second transaction data associated with the unique identifier from the clearing request message; and initiating, by the transaction processing system, clearing of the electronic payment transaction based on the retrieved at least a portion of the first transaction data and the second transaction data associated with the unique identifier.

Clause 2: The method of clause 1, further comprising: transmitting, by the transaction processing system, the authorization request message to an issuer system, wherein the issuer system generates the authorization decision.

Clause 3: The method of clause 1 or 2, wherein the clearing request message comprises only the unique identifier associated with the electronic payment transaction.

Clause 4: The method of any of clauses 1-3, wherein the clearing request message comprises only the unique identifier associated with the electronic payment transaction and updated first and/or second transaction data.

Clause 5: The method of any of clauses 1-4, wherein the clearing request message does not comprise transaction data associated with transactions other than the electronic payment transaction.

Clause 6: The method of any of clauses 1-5, wherein the clearing request message is received by the transaction processing system in real-time or near real-time relative to transmission of the response message.

Clause 7: The method of any of clauses 1-6, wherein the at least a portion of the first transaction data and the second transaction data stored by the transaction processing system in association with the unique identifier for the electronic payment transaction comprises all transaction data required to clear the electronic payment transaction.

Clause 8: A system comprising at least one processor; and at least one non-transitory computer-readable medium storing instructions that, when executed by the at least one processor, cause the at least one processor to: receive an authorization request message associated with an electronic payment transaction from an acquirer system, wherein the authorization request message comprises first transaction data associated with the electronic payment transaction; generate a unique identifier associated with the electronic payment transaction; receive an authorization response message associated with the electronic payment transaction from an issuer system, wherein the authorization response message comprises second transaction data associated with the electronic payment transaction, the second transaction data comprising an authorization decision indicating that the electronic payment transaction is authorized; store at least a portion of the first transaction data and the second transaction data in association with the unique identifier for the electronic payment transaction; transmit a response message comprising the unique identifier and the authorization decision to the acquirer system; receive a clearing request message comprising the unique identifier associated with the electronic payment transaction from the acquirer system; in response to receiving the clearing request message, retrieve the stored at least a portion of the first transaction data and the second transaction data associated with the unique identifier from the clearing request message; and initiate clearing of the electronic payment transaction based on the retrieved at least a portion of the first transaction data and the second transaction data associated with the unique identifier.

Clause 9: The system of clause 8, wherein the instructions further cause the at least one processor to: transmit the authorization request message to an issuer system, wherein the issuer system generates the authorization decision.

Clause 10: The system of clause 8 or 9, wherein the clearing request message comprises only the unique identifier associated with the electronic payment transaction.

Clause 11: The system of any of clauses 8-10, wherein the clearing request message comprises only the unique identifier associated with the electronic payment transaction and updated first and/or second transaction data.

Clause 12: The system of any of clauses 8-11, wherein the clearing request message does not comprise transaction data associated with transactions other than the electronic payment transaction.

Clause 13: The system of any of clauses 8-12, wherein the clearing request message is received by the transaction processing system in real-time or near real-time relative to transmission of the response message.

Clause 14: The system of any of clauses 8-13, wherein the at least a portion of the first transaction data and the second transaction data stored by the transaction processing system in association with the unique identifier for the electronic payment transaction comprises all transaction data required to clear the electronic payment transaction.

Clause 15: A computer program product comprising at least one non-transitory computer-readable medium including program instructions that, when executed by at least one processor, cause the at least one processor to: receive an authorization request message associated with an electronic payment transaction from an acquirer system, wherein the authorization request message comprises first transaction data associated with the electronic payment transaction; generate a unique identifier associated with the electronic payment transaction; receive an authorization response message associated with the electronic payment transaction from an issuer system, wherein the authorization response message comprises second transaction data associated with the electronic payment transaction, the second transaction data comprising an authorization decision indicating that the electronic payment transaction is authorized; store at least a portion of the first transaction data and the second transaction data in association with the unique identifier for the electronic payment transaction; transmit a response message comprising the unique identifier and the authorization decision to the acquirer system; receive a clearing request message comprising the unique identifier associated with the electronic payment transaction from the acquirer system; in response to receiving the clearing request message, retrieve the stored at least a portion of the first transaction data and the second transaction data associated with the unique identifier from the clearing request message; and initiate clearing of the electronic payment transaction based on the retrieved at least a portion of the first transaction data and the second transaction data associated with the unique identifier.

Clause 16: The computer program product of clause 15, wherein the program instructions further cause the at least one processor to: transmit the authorization request message to an issuer system, wherein the issuer system generates the authorization decision.

Clause 17: The computer program product of clause 15 or 16, wherein the clearing request message comprises only the unique identifier associated with the electronic payment transaction.

Clause 18: The computer program product of any of clauses 15-17, wherein the clearing request message comprises only the unique identifier associated with the electronic payment transaction and updated first and/or second transaction data.

Clause 19: The computer program product of any of clauses 15-18, wherein the clearing request message does not comprise transaction data associated with transactions other than the electronic payment transaction.

Clause 20: The computer program product of any of clauses 15-19, wherein the clearing request message is received by the transaction processing system in real-time or near real-time relative to transmission of the response message.

Clause 21: The computer program product of any of clauses 15-20, wherein the at least a portion of the first transaction data and the second transaction data stored by the transaction processing system in association with the unique identifier for the electronic payment transaction comprises all transaction data required to clear the electronic payment transaction.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter.

BRIEF DESCRIPTION OF THE DRAWINGS

Additional advantages and details are explained in greater detail below with reference to the non-limiting, exemplary embodiments that are illustrated in the accompanying schematic figures, in which.

DETAILED DESCRIPTION

Figure 1:
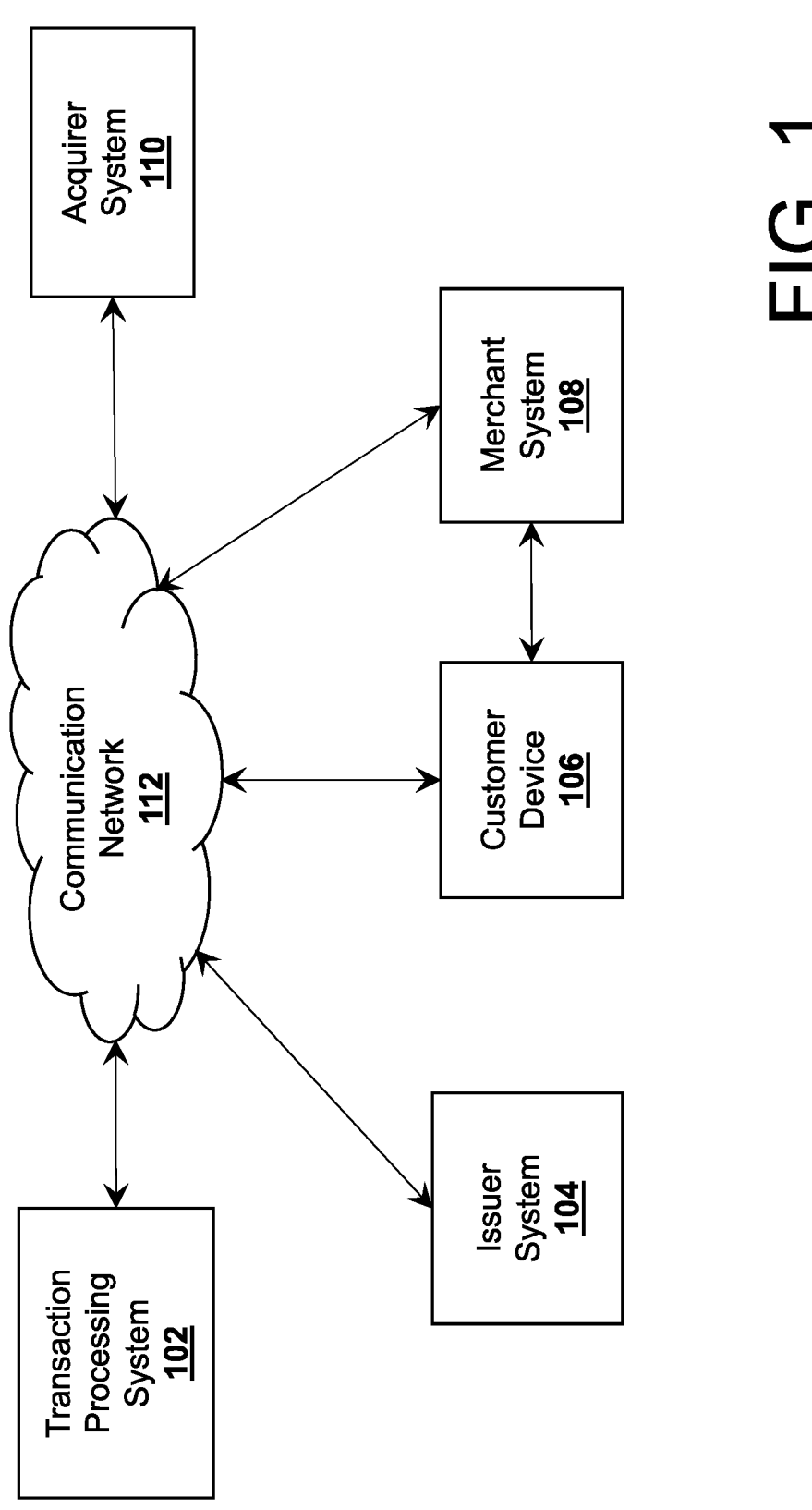
FIG. 1 is a diagram of an exemplary environment in which methods, systems, and/or computer program products, described herein, may be implemented according to some non-limiting embodiments or aspects.

For purposes of the description hereinafter, the terms "end," "upper," "lower," "right," "left," "vertical," "horizontal," "top," "bottom," "lateral," "longitudinal," and derivatives thereof shall relate to the embodiments as they are oriented in the drawing figures. However, it is to be understood that the embodiments may assume various alternative variations and step sequences, except where expressly specified to the contrary. It is also to be understood that the specific devices and processes illustrated in the attached drawings and described in the following specification, are simply exemplary embodiments or aspects of the disclosed subject matter. Hence, specific dimensions and other physical characteristics related to the embodiments or aspects disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. In addition, reference to an action being "based on" a condition may refer to the action being "in response to" the condition. For example, the phrases "based on" and "in response to" may, in some non-limiting embodiments or aspects, refer to a condition for automatically triggering an action (e.g., a specific operation of an electronic device, such as a computing device, a processor, and/or the like).

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments or aspects, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit. In some non-limiting embodiments or aspects, a message may refer to a network packet (e.g., a data packet and/or the like) that includes data. It will be appreciated that numerous other arrangements are possible.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer.

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a PAN, to a customer that uniquely identifies one or more accounts associated with that customer. The account identifier may be embodied on a payment device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications.

As used herein, a "point-of-sale (POS) device" may refer to one or more devices, which may be used by a merchant to conduct a transaction (e.g., a payment transaction) and/or process a transaction. For example, a POS device may include one or more client devices. Additionally or alternatively, a POS device may include peripheral devices, card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, and/or the like. As used herein, a "point-of-sale (POS) system" may refer to one or more client devices and/or peripheral devices used by a merchant to conduct a transaction. For example, a POS system may include one or more POS devices and/or other like devices that may be used to conduct a payment transaction. In some non-limiting embodiments or aspects, a POS system (e.g., a merchant POS system) may include one or more server computers programmed or configured to process online payment transactions through webpages, mobile applications, and/or the like.

As used herein, the terms "client" and "client device" may refer to one or more client-side devices or systems (e.g., remote from a transaction service provider) used to initiate or facilitate a transaction (e.g., a payment transaction). As an example, a "client device" may refer to one or more POS devices used by a merchant, one or more acquirer host computers used by an acquirer, one or more mobile devices used by a user, and/or the like. In some non-limiting embodiments or aspects, a client device may be an electronic device configured to communicate with one or more networks and initiate or facilitate transactions. For example, a client device may include one or more computers, portable computers, laptop computers, tablet computers, mobile devices, cellular phones, wearable devices (e.g., watches, glasses, lenses, clothing, and/or the like), PDAs, and/or the like. Moreover, a "client" may also refer to an entity (e.g., a merchant, an acquirer, and/or the like) that owns, utilizes, and/or operates a client device for initiating transactions (e.g., for initiating transactions with a transaction service provider).

As used herein, the term "payment device" may refer to an electronic payment device, a portable financial device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a personal digital assistant (PDA), a pager, a security card, a computing device, an access card, a wireless terminal, a transponder, and/or the like. In some non-limiting embodiments or aspects, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of payment devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, point-of-sale (POS) devices, mobile devices, etc.) directly or indirectly communicating in the network environment may constitute a "system."

As used herein, the term "system" may refer to one or more computing devices or combinations of computing devices (e.g., processors, servers, client devices, software applications, components of such, and/or the like). Reference to "a device," "a server," "a processor," and/or the like, as used herein, may refer to a previously-recited device, server, or processor that is recited as performing a previous step or function, a different device, server, or processor, and/or a combination of devices, servers, and/or processors. For example, as used in the specification and the claims, a first device, a first server, or a first processor that is recited as performing a first step or a first function may refer to the same or different device, server, or processor recited as performing a second step or a second function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments or aspects, may be operated by or on behalf of a transaction service provider.

Non-limiting embodiments or aspects of the disclosed subject matter are directed to systems, methods, and computer program products for processing a payment transaction over an electronic payment processing network. The electronic payment processing network may comprise a transaction processing system in communication with one or more acquirer systems and one or more issuer systems to process electronic payment transactions initiated between a user (e.g. a consumer) and a merchant system. For example, non-limiting embodiments or aspects of the disclosed subject matter enable acquirers to initiate clearing processing of electronic payment transactions by providing a single key matching identifier in a clearing request message for each electronic payment transaction. The present disclosure reduces the burden on the computing resources expended by the acquirer systems by reducing the number of data elements that are received and/or stored by the acquirer system for each transaction. The present disclosure also reduces or eliminates the need for the acquirer system to execute, match, and return logic in order to generate clearing requests. By reducing the burden on acquirer systems, the present disclosure also expedites the clearing of transactions and reduces the exposure to losses caused by transaction clearing delays. According to some non-limiting embodiments or aspects, clearing of transactions may instead be processed in real-time or near real-time relative to transmission of the response message (e.g., after the authorization process is complete). The present disclosure also reduces or eliminates redundant processing of the data elements involved in clearing the transaction, compared to existing systems. As opposed to the acquirer system first processing the complete set of clearing data elements to generate the clearing request, and then the transaction processing system re-processing much of the same data in order to initiate clearing processing, the present disclosure significantly reduces the processing on the part of the acquirer system (and thus on the payment network as a whole) to generate the clearing request. Further, the present disclosure reduces the likelihood that a single transaction will process more than once, thereby streamlining the clearing process.

Referring now to FIG. 1, FIG. 1 is a diagram of a non-limiting embodiment or aspect of an exemplary environment 100 in which systems, methods, and/or products, as described herein, may be implemented. As shown in FIG. 1, environment 100 may include transaction processing system 102, issuer system 104, customer device 106, merchant system 108, acquirer system 110, and/or communication network 112.

Transaction service provider system 102 may include one or more devices capable of receiving information from and/or communicating information to issuer system 104, customer device 106, merchant system 108, and/or acquirer system 110 via communication network 112. For example, transaction processing system 102 may include a computing device, such as a server (e.g., a transaction processing server), a group of servers, and/or other like devices. In some non-limiting embodiments or aspects, transaction processing system 102 may be associated with a transaction service provider as described herein. In some non-limiting embodiments or aspects, transaction processing system 102 may be in communication with a data storage device, which may be local or remote to transaction processing system 102. In some non-limiting embodiments or aspects, transaction processing system 102 may be capable of receiving information from, storing information in, communicating information to, or searching information stored in the data storage device.

Issuer system 104 may include one or more devices capable of receiving information and/or communicating information to transaction processing system 102, customer device 106, merchant system 108, and/or acquirer system 110 via communication network 112. For example, issuer system 104 may include a computing device, such as a server, a group of servers, and/or other like devices. In some non-limiting embodiments or aspects, issuer system 104 may be associated with an issuer institution as described herein. For example, issuer system 104 may be associated with an issuer institution that issued a credit account, debit account, credit card, debit card, and/or the like to a user associated with customer device 106.

Customer device 106 may include one or more devices capable of receiving information from and/or communicating information to transaction processing system 102, issuer system 104, merchant system 108, and/or acquirer system 110 via communication network 112. Additionally or alternatively, each customer device 106 may include a device capable of receiving information from and/or communicating information to other customer devices 106 via communication network 112, another network (e.g., an ad hoc network, a local network, a private network, a virtual private network, and/or the like), and/or any other suitable communication technique. For example, customer device 106 may include a client device and/or the like. In some non-limiting embodiments or aspects, customer device 106 may or may not be capable of receiving information (e.g., from merchant system 108 or from another customer device 106) via a short-range wireless communication connection (e.g., an NFC communication connection, an RFID communication connection, a Bluetooth® communication connection, a Zigbee® communication connection, and/or the like), and/or communicating information (e.g., to merchant system 108) via a short-range wireless communication connection.

Merchant system 108 may include one or more devices capable of receiving information from and/or communicating information to transaction processing system 102, issuer system 104, customer device 106, and/or acquirer system 110 via communication network 112. Merchant system 108 may also include a device capable of receiving information from customer device 106 via communication network 112, a communication connection (e.g., an NFC communication connection, an RFID communication connection, a Bluetooth® communication connection, a Zigbee® communication connection, and/or the like) with customer device 106, and/or the like, and/or communicating information to customer device 106 via communication network 112, the communication connection, and/or the like. In some non-limiting embodiments or aspects, merchant system 108 may include a computing device, such as a server, a group of servers, a client device, a group of client devices, and/or other like devices. In some non-limiting embodiments or aspects, merchant system 108 may be associated with a merchant as described herein. In some non-limiting embodiments or aspects, merchant system 108 may include one or more client devices. For example, merchant system 108 may include a client device that allows a merchant to communicate information to transaction processing system 102. In some non-limiting embodiments or aspects, merchant system 108 may include one or more devices, such as computers, computer systems, and/or peripheral devices capable of being used by a merchant to conduct a transaction with a user. For example, merchant system 108 may include a POS device and/or a POS system.

Acquirer system 110 may include one or more devices capable of receiving information from and/or communicating information to transaction processing system 102, issuer system 104, customer device 106, and/or merchant system 108 via communication network 112. For example, acquirer system 110 may include a computing device, a server, a group of servers, and/or the like. In some non-limiting embodiments or aspects, acquirer system 110 may be associated with an acquirer as described herein.

Communication network 112 may include one or more wired and/or wireless networks. For example, communication network 112 may include a cellular network (e.g., a long-term evolution (LTER) network, a third generation (3G) network, a fourth generation (4G) network, a fifth generation (5G) network, a code division multiple access (CDMA) network, and/or the like), a public land mobile network (PLMN), a local area network (LAN), a wide area network (WAN), a metropolitan area network (MAN), a telephone network (e.g., the public switched telephone network (PSTN)), a private network (e.g., a private network associated with a transaction service provider), an ad hoc network, an intranet, the Internet, a fiber optic-based network, a cloud computing network, and/or the like, and/or a combination of these or other types of networks.

The number and arrangement of systems, devices, and/or networks shown in FIG. 1 are provided as an example. There may be additional systems, devices, and/or networks; fewer systems, devices, and/or networks; different systems, devices, and/or networks; and/or differently arranged systems, devices, and/or networks than those shown in FIG. 1. Furthermore, two or more systems or devices shown in FIG. 1 may be implemented within a single system or device, or a single system or device shown in FIG. 1 may be implemented as multiple, distributed systems or devices. Additionally or alternatively, a set of systems (e.g., one or more systems) or a set of devices (e.g., one or more devices) of environment 100 may perform one or more functions described as being performed by another set of systems or another set of devices of environment 100.

Figure 2:
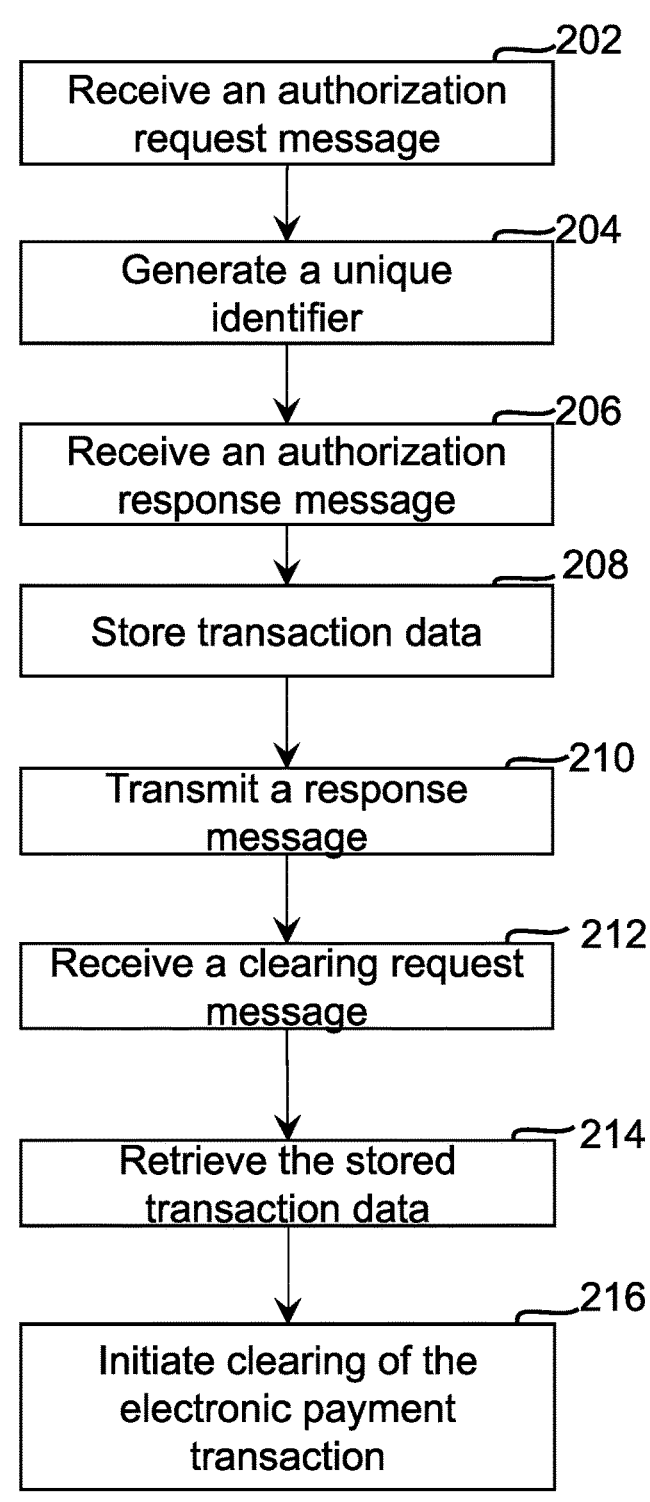
FIG. 2 is a flow diagram for a method of processing a payment transaction over an electronic payment processing network according to some non-limiting embodiments or aspects.

Referring now to FIG. 2, FIG. 2 is an example of a process 200 for processing a payment transaction over an electronic payment processing network, according to some non-limiting embodiments or aspects. The steps shown in FIG. 2 are for example purposes only. It will be appreciated that additional, fewer, different, and/or a different order of steps may be used in non-limiting embodiments or aspects. In some non-limiting embodiments or aspects, one or more of the steps of process 200 may be performed (e.g., completely, partially, and/or the like) by the transaction processing system 102 (e.g., one or more devices of the transaction processing system 102). In some non-limiting embodiments or aspects, one or more of the steps of process 200 may be performed (e.g., completely, partially, and/or the like) by another system, another device, another group of systems, or another group of devices, separate from or including the transaction processing system 102, such as the issuer system 104, customer device 106, merchant system 108, and/or acquirer system 110. It will be appreciated that a subsequent step may be executed automatically in response to completion of at least one preceding step.

As shown in FIG. 2, at step 202, process 200 may include receiving an authorization request message. For example, transaction processing system 102, may receive an authorization request message from acquirer system 110. In some non-limiting embodiments or aspects, the authorization request message may be associated with an electronic payment transaction. In some non-limiting embodiments or aspects, the authorization request message may include first transaction data (e.g., a transaction amount, a transaction date, a transaction time, other data elements specified in ISO 8583, etc.) associated with the electronic payment transaction.

As shown in FIG. 2, at step 204, process 200 may include generating a unique identifier. For example, in response to receiving the authorization request message, transaction processing system 102 may generate a unique identifier associated with the electronic payment transaction. In some non-limiting embodiments or aspects, the unique identifier may be capable of uniquely identifying the electronic payment transaction from any other electronic payment transactions.

In some non-limiting embodiments or aspects, the unique identifier may be a code (e.g., a transaction identification number). For example, the unique identifier may be a unique numeric, alphabetical, and/or alphanumeric identifier. In some non-limiting embodiments or aspects, when the transaction is initiated, transaction processing system 102 may automatically generate the transaction identification number and/or assign the transaction identification number to the electronic payment transaction.

In some non-limiting embodiments or aspects, transaction processing system 102 may transmit the authorization request message to issuer system 104 to cause the issuer system 104 to generate an authorization decision.

As shown in FIG. 2, at step 206, process 200 may include receiving an authorization response message. For example, transaction processing system 102 may receive an authorization response message from issuer system 104. In some non-limiting embodiments or aspects, the authorization response message may be associated with the electronic payment transaction. In some non-limiting embodiments or aspects, the authorization message may include second transaction data associated with the electronic payment transaction, different from the first transaction data. In some non-limiting embodiments or aspects, the second transaction data may include an authorization decision. The authorization decision may indicate whether the electronic payment transaction is authorized, declined, and/or at least partially authorized. The second transaction data may further include data generated by the issuer system 104 in the course of generating the authorization decision associated with the electronic payment transaction In some non-limiting embodiments or aspects, in response to receiving the authorization request message, issuer system 104 may generate the authorization decision. In some non-limiting embodiments or aspects, when generating the authorization decision, issuer system 104 may determine whether the electronic payment transaction is authorized, declined, and/or authorized in part.

In some non-limiting embodiments or aspects, issuer system 104 may generate the authorization response message. For example, issuer system 104 may generate an authorization response message associated with the electronic payment transaction based on and/or automatically in response to receiving the at least one of the authorization request message, the transaction identification number, and/or the second transaction data. In some non-limiting embodiments or aspects, issuer system 104 may generate the authorization response message in response to receiving the authorization request message and/or in response to generating the authorization decision.

As shown in FIG. 2, at step 208, process 200 may include storing transaction data. For example, transaction processing system 102 may store transaction data. In some non-limiting embodiments or aspects, transaction processing system 102 may store at least a portion of the first transaction data and/or the second transaction data in association with the unique identifier for the electronic payment transaction.

In some non-limiting embodiments or aspects, transaction processing system 102 may store the at least a portion of the first transaction data and/or the second transaction data in association with the unique identifier for the electronic payment transaction in a memory of at least one device of transaction processing system 102.

As shown in FIG. 2, at step 210, process 200 may include transmitting a response message. For example, transaction processing system 102 may transmit a response message to acquirer system 110. In some non-limiting embodiments or aspects, transaction processing system 102 may generate the response message. In some non-limiting embodiments or aspects, the response message may include the unique identifier and/or the authorization decision. Acquirer system 110 may store at least a portion of the data elements contained in the response message in a data storage device, such as by storing the unique identifier in the data storage device. The acquirer system 110 may not store at least a portion of the first and second transaction data stored by the transaction processing system, thus reducing the computing load on the acquirer system to process (e.g., including clearing) electronic payment transactions.

As shown in FIG. 2, at step 212, process 200 may include receiving a clearing request message. For example, transaction processing system 102 may receive a clearing request message from acquirer system 110. In some non-limiting embodiments or aspects, the clearing request may include the unique identifier associated with the electronic payment transaction.

In some non-limiting embodiments or aspects, acquirer system 110 may generate the clearing request. In some non-limiting embodiments or aspects, acquirer system 110 may send the clearing request to transaction processing system 102.

In some non-limiting embodiments or aspects, the clearing request message may include only the unique identifier associated with the electronic payment transaction. In some non-limiting embodiments or aspects, the clearing request message may include only the unique identifier associated with the electronic payment transaction and updated first and/or second transaction data. For example, if transaction data, such as a value of a transaction amount changes before the transaction is cleared, acquirer system 110 may include the changed value of the transaction amount and the unique identifier. In some non-limiting embodiments or aspects, the clearing request message may be received by transaction processing system 102 in real-time or near real-time relative to the transmission of the response message. The clearing request message may be received by transaction processing system 102 in less than 1 hour, less than 30 minutes, less than 5 minutes, less than 1 minute, less than 10 seconds, or less than 1 second, relative to the transmission of the response message. For example, the clearing request message may not be submitted in association with a clearing batch for a plurality of electronic payment transactions at the end of the day, but in real-time or near real-time relative to the transmission of the response message.

In some non-limiting embodiments or aspects, the clearing request message may not include transaction data associated with transactions other than the electronic payment transaction. For example, the clearing request message may not be submitted in association with a clearing batch for a plurality of electronic payment transactions.

As shown in FIG. 2, at step 214, process 200 may include retrieving the stored transaction data. For example, in response to receiving the clearing request, transaction processing system 102 may retrieve the stored at least a portion of the first transaction data and the second transaction data associated with the unique identifier from the clearing request message from the memory of the at least one device of transaction processing system 102. The transaction processing system 102 may query the database in which the transaction data is stored based on the unique identifier contained in the clearing request.

In some non-limiting embodiments or aspects, the at least a portion of the first data and the second transaction data stored by transaction processing system 102 in association with the unique identifier for the electronic payment transaction may include all transaction data required to clear the electronic payment transaction.

As shown in FIG. 2, at step 216, process 200 may include initiating clearing of the electronic payment transaction. For example, transaction processing system 102 may initiate clearing of the electronic payment transaction based on the retrieved at least a portion of the first transaction data and the second transaction data associated with the unique identifier. For example, clearing may include settling which may include automatically transferring at least a portion of the transaction amount of the electronic payment transaction from an account of the user (who initiated the electronic payment transaction using a payment device) to an account of the merchant.

Figure 4:
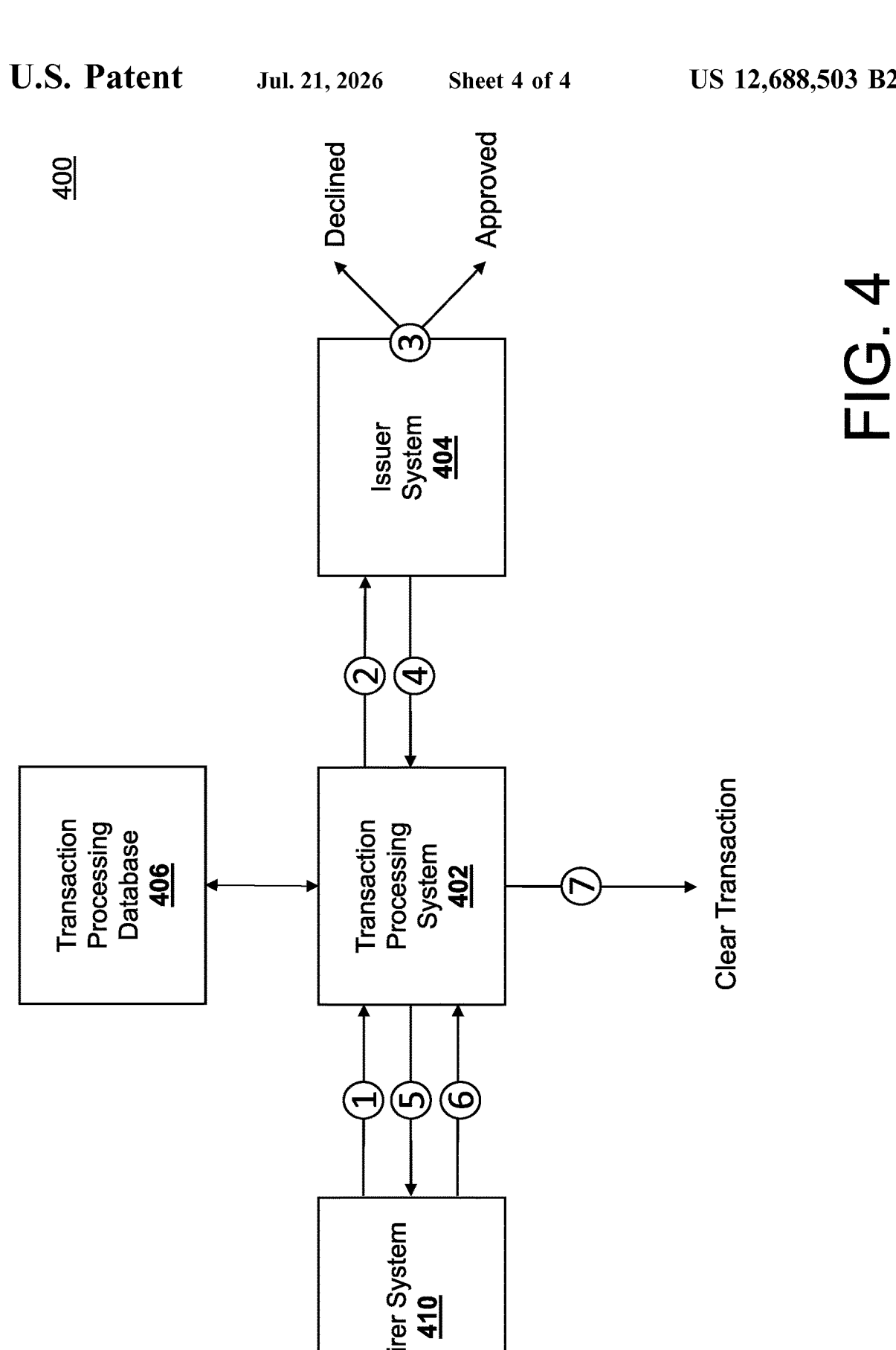
FIG. 4 is a flow diagram for a method of network message augmentation for processing a payment transaction over an electronic payment processing network, according to some non-limiting embodiments or aspects.

Referring now to FIG. 4, shown is a flow diagram for a method 400 of network message augmentation for processing a payment transaction over an electronic payment processing network, according to some non-limiting embodiments or aspects. The steps shown in FIG. 4 are for example purposes only. It will be appreciated that additional, fewer, different, and/or a different order of steps may be used in non-limiting embodiments or aspects. In some non-limiting embodiments or aspects, one or more of the steps of method 400 may be performed (e.g., completely, partially, and/or the like) by the transaction processing system 402 (e.g., one or more devices of the transaction processing system 102). In some non-limiting embodiments or aspects, one or more of the steps of process 400 may be performed (e.g., completely, partially, and/or the like) by another system, another device, another group of systems, or another group of devices, separate from or including the transaction processing system 402, such as the issuer system 404, transaction processing database 406, and/or acquirer system 410. In some non-limiting embodiments or aspects, transaction processing system 402 may be the same as, similar to, and/or or part of transaction processing system 102. In some non-limiting embodiments or aspects, issuer system 404 may be the same as, similar to, and/or part of issuer system 104. In some non-limiting embodiments or aspects, acquirer system 410 may be the same as, similar to, and/or part of acquirer system 110.

In some non-limiting embodiments or aspects, transaction processing system 402 may include transaction processing database 406 (e.g., a data storage device), as described herein. In some non-limiting embodiments or aspects, transaction processing database 406 may be in communication with transaction processing system 402. In some non-limiting embodiments or aspects, transaction processing database 406 may be part of transaction processing system 402. In some non-limiting embodiments or aspects, transaction processing database 406 may include at least one memory.

As shown in step 1, acquirer system 410 may communicate with transaction processing system 402. For example, acquirer system 410 may generate and/or send an authorization request message associated with an electronic payment transaction to transaction processing system 402. The authorization request message may include first transaction data (e.g., a transaction amount, a transaction date, a transaction time, other data elements specified in ISO 8583, and/or the like) associated with the electronic payment transaction.

In some non-limiting embodiments or aspects, in response to receiving the authorization request message, transaction processing system 402 may automatically generate a unique identifier to be associated with the first transaction data. The unique identifier may be associated with the electronic payment transaction and/or be capable of identifying the electronic payment transaction from other electronic payment transactions. For example, the unique identifier may be a transaction identification number. In some non-limiting embodiments or aspects, in response to initiating the transaction and/or generating the unique identifier, transaction processing system 402 may automatically assign the transaction identification number to the electronic payment transaction.

As shown in step 2, transaction processing system 402 may communicate with issuer system 404. For example, in response to generating the transaction identification number and/or assigning the transaction identification number to the electronic payment transaction, transaction processing system 402 may send the authorization request message and/or the transaction identification number to issuer system 404. In some non-limiting embodiments or aspects, the authorization request message may be modified to include the transaction identification number. Issuer system 404 may store the transaction identification number in association with the electronic payment transaction in a data storage device associated therewith.

As shown in step 3, issuer system 404 may determine whether the electronic payment transaction is authorized (e.g., approved) or declined (e.g., denied) or some combination thereof (e.g., approved in part). For example, in response to receiving the authorization request message and/or the transaction identification number, issuer system 404 may generate an authorization decision. In some non-limiting embodiments or aspects, in response to determining whether the electronic payment transaction is authorized or declined, issuer system 404 may generate an authorization decision (e.g., an indication of whether the electronic payment is authorized or declined). In some non-limiting embodiments or aspects, in response to determining whether the electronic payment transaction is authorized or declined, issuer system 404 may generate an authorization response message associated with the electronic payment transaction. In some non-limiting embodiments or aspects, the authorization response message may include the authorization decision.

As shown in step 4, issuer system 404 may communicate the authorization response message to transaction processing system 402. For example, issuer system 404 may automatically send the authorization response message including the authorization decision to transaction processing system 402.

In some non-limiting embodiments or aspects, in response to receiving the authorization response message, transaction processing system 402 may store data associated with the authorization response message. For example, transaction processing system 402 may store at least a portion of the first transaction data and/or the second transaction data, such as the authorization decision, in association with the unique identifier for the electronic payment transaction, in a memory of at least one device of transaction processing system 102 (e.g., the transaction processing database 406).

In some non-limiting embodiments or aspects, in response to receiving the authorization response message, transaction processing system 402 may store the at least a portion of the first transaction data and/or the second transaction data in transaction processing database 406 (e.g., in memory of transaction processing database 406) in association with the unique identifier.

In some non-limiting embodiments or aspects, storing the data associated with the authorization response message may reduce (e.g., minimize) the need for transaction processing system 402 and/or the acquirer system 410 to retain, match, and/or return logic.

In some non-limiting embodiments or aspects, in response to receiving the authorization response message including the authorization decision, transaction processing system 402 may generate a response message. The response message may include the unique identifier and/or the authorization decision.

As shown in step 5, transaction processing system 402 may communicate with acquirer system 410. For example, transaction processing system 402 may transmit the response message including the unique identifier and/or the authorization decision to acquirer system 410.

In some non-limiting embodiments or aspects, in response to receiving the response message including the unique identifier and/or the authorization decision, acquirer system 410 may automatically generate a clearing request. The clearing request may include the unique identifier associated with the electronic payment transaction and/or updated first and/or second transaction data. In some non-limiting embodiments or aspects, the clearing request message may include only the unique identifier associated with the electronic payment transaction. In some non-limiting embodiments or aspects, the clearing request message may include only the unique identifier associated with the electronic payment transaction and updated first and/or second transaction data. In some non-limiting embodiments or aspects, the clearing request message may not include transaction data associated with transactions other than the electronic payment transaction. For example, the clearing request message may not be submitted in association with a clearing batch for a plurality of electronic payment transactions.

As shown in step 6, acquirer system 410 may communicate with transaction processing system 402. For example, acquirer system 410 may automatically send the clearing request to transaction processing system 402 to initiate clearing the transaction. In some non-limiting embodiments or aspects, the clearing request may be sent to and/or received by transaction processing system 402 in real-time (e.g., in less than 1 hour, less than 30 minutes, less than 5 minutes, less than 1 minute, less than 10 seconds, or less than 1 second) relative to the transmission of the response message.

In some non-limiting embodiments or aspects, in response to receiving the clearing request, transaction processing system 402 may retrieve the stored transaction data associated with the electronic payment transaction from the transaction processing database 406. For example, in response to receiving the clearing request, transaction processing system 402 may retrieve the stored at least a portion of the first transaction data and the second transaction data associated with the unique identifier from the clearing request message from the memory of the at least one device of transaction processing system 402. In some non-limiting embodiments or aspects, transaction processing system 402 may retrieve the stored transaction data from transaction processing database 406 (e.g., a memory of transaction processing database 406).

In some non-limiting embodiments or aspects, the stored transaction data may include all the transaction required to clear the electronic payment transaction. For example, the at least a portion of the first data and the second transaction data stored by transaction processing system 402 in association with the unique identifier for the electronic payment transaction may include all transaction data required to clear the electronic payment transaction.

As shown in step 7, transaction processing system 402 may modify the clearing request. For example, in response to retrieving the stored transaction data, transaction processing system 402 may automatically modify the clearing request by populating one or more details of the clearing request with the transaction data. In some non-limiting embodiments or aspects, transaction processing system 402 may modify the clearing request to include at least the unique identifier for the electronic payment transaction in association with at least a portion of the stored transaction data, such as the transaction data required to clear the electronic payment transaction.

In some non-limiting embodiments or aspects, the electronic payment transaction may be cleared based on the modified clearing request. Clearing may include settling which may include automatically transferring at least a portion of the transaction amount of the electronic payment transaction from an account of the user (who initiated the electronic payment transaction using a payment device) to an account of the merchant.

Figure 3:
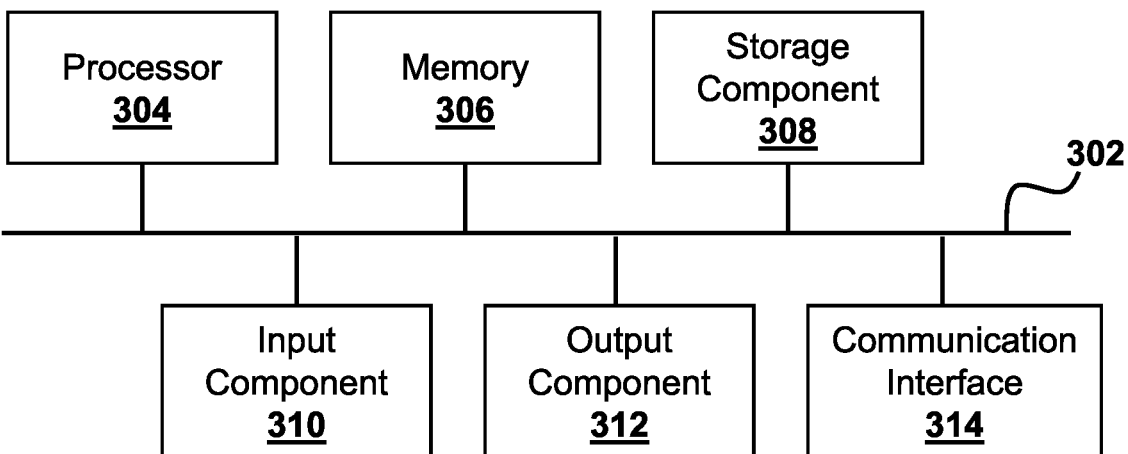
FIG. 3 is a schematic diagram of example components of one or more devices of FIG. 1 or FIG. 4 according to some non-limiting embodiments or aspects.

Referring now to FIG. 3, shown is a diagram of example components of a device 300 according to non-limiting embodiments or aspects. Device 300 may correspond to at least one of transaction processing system 102, issuer system 104, customer device 106, merchant system 108, and/or acquirer system 110 in FIG. 1 and/or transaction processing system 402, issuer system 404, transaction processing database 406, and/or acquirer system 410 in FIG. 4, as an example. In some non-limiting embodiments or aspects, such systems or devices in FIGS. 1 and 4 may include at least one device 300 and/or at least one component of device 300. The number and arrangement of components shown in FIG. 3 are provided as an example. In some non-limiting embodiments or aspects, device 300 may include additional components, fewer components, different components, or differently arranged components than those shown in FIG. 3. Additionally or alternatively, a set of components (e.g., one or more components) of device 300 may perform one or more functions described as being performed by another set of components of device 300.

As shown in FIG. 3, device 300 may include bus 302, processor 304, memory 306, storage component 308, input component 310, output component 312, and communication interface 314. Bus 302 may include a component that permits communication among the components of device 300. In some non-limiting embodiments or aspects, processor 304 may be implemented in hardware, firmware, or a combination of hardware and software. For example, processor 304 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 306 may include random access memory (RAM), read only memory (ROM), and/or another type of dynamic or static storage device (e.g., flash memory, magnetic memory, optical memory, etc.) that stores information and/or instructions for use by processor 304.

With continued reference to FIG. 3, storage component 308 may store information and/or software related to the operation and use of device 300. For example, storage component 308 may include a hard disk (e.g., a magnetic disk, an optical disk, a magneto-optic disk, a solid state disk, etc.) and/or another type of computer-readable medium. Input component 310 may include a component that permits device 300 to receive information, such as via user input (e.g., a touch screen display, a keyboard, a keypad, a mouse, a button, a switch, a microphone, etc.). Additionally, or alternatively, input component 310 may include a sensor for sensing information (e.g., a global positioning system (GPS) component, an accelerometer, a gyroscope, an actuator, etc.). Output component 312 may include a component that provides output information from device 300 (e.g., a display, a speaker, one or more light-emitting diodes (LEDs), etc.). Communication interface 314 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 314 may permit device 300 to receive information from another device and/or provide information to another device. For example, communication interface 314 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 300 may perform one or more processes described herein. Device 300 may perform these processes based on processor 304 executing software instructions stored by a computer-readable medium, such as memory 306 and/or storage component 308. A computer-readable medium may include any non-transitory memory device. A memory device includes memory space located inside of a single physical storage device or memory space spread across multiple physical storage devices. Software instructions may be read into memory 306 and/or storage component 308 from another computer-readable medium or from another device via communication interface 314. When executed, software instructions stored in memory 306 and/or storage component 308 may cause processor 304 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed to" or "configured to," as used herein, may refer to an arrangement of software, device(s), and/or hardware for performing and/or enabling one or more functions (e.g., actions, processes, steps of a process, and/or the like). For example, "a processor configured to" or "a process programmed to" may refer to a processor that executes software instructions (e.g., program code) that cause the processor to perform one or more functions.

Although embodiments have been described in detail for the purpose of illustration, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment or aspect can be combined with one or more features of any other embodiment or aspect. In fact, any of these features can be combined in ways not specifically recited in the claims and/or disclosed in the specification. Although each dependent claim listed below may directly depend on only one claim, the disclosure of possible implementations includes each dependent claim in combination with every other claim in the claim set.

What is claimed is:

1. A method for processing a payment transaction over an electronic payment processing network, the method comprising:

receiving, by a transaction processing system, an authorization request message associated with an electronic payment transaction from an acquirer system, wherein the authorization request message comprises first transaction data associated with the electronic payment transaction initiated by a first payment device;

generating, by the transaction processing system, a unique identifier associated with the electronic payment transaction;

automatically modifying, by the transaction processing system, the authorization request message to include the unique identifier, forming a modified authorization request;

transmitting, by the transaction processing system, the modified request message to an issuer system that issued the first payment device;

receiving, by the transaction processing system, an authorization response message associated with the electronic payment transaction from the issuer system, wherein the authorization response message comprises second transaction data associated with the electronic payment transaction, the second transaction data comprising an authorization decision indicating that the electronic payment transaction is authorized;

storing, by a database of the transaction processing system, at least a portion of the first transaction data and the second transaction data in association with the unique identifier for the electronic payment transaction;

transmitting, by the transaction processing system, a response message comprising the unique identifier and the authorization decision to the acquirer system;

in real-time relative to transmitting the response message, receiving, by the transaction processing system, a clearing request message including only the unique identifier associated with the electronic payment transaction and optionally updated first and/or second transaction data from the acquirer system;

in response to receiving the clearing request message, retrieving, from the database of the transaction processing system, the stored at least a portion of the first transaction data and the second transaction data associated with the unique identifier based on the unique identifier from the clearing request message;

automatically modifying, by the transaction processing system, the clearing request message to include the retrieved at least a portion of the first transaction data and the second transaction data associated with the unique identifier, forming a modified clearing request; and initiating, by the transaction processing system, clearing of the electronic payment transaction between the issuer system and the acquirer system based on the modified clearing request.

2. The method of claim 1, wherein the clearing request message does not comprise transaction data associated with transactions other than the electronic payment transaction.

3. The method of claim 1, wherein the at least a portion of the first transaction data and the second transaction data stored by the database of the transaction processing system in association with the unique identifier for the electronic payment transaction comprises all transaction data required to clear the electronic payment transaction.

4. A system comprising:

at least one processor of a transaction processing system; and at least one non-transitory computer-readable medium storing instructions that, when executed by the at least one processor, cause the at least one processor to:

receive an authorization request message associated with an electronic payment transaction from an acquirer system, wherein the authorization request message comprises first transaction data associated with the electronic payment transaction initiated by a first payment device;

generate a unique identifier associated with the electronic payment transaction;

automatically modify the authorization request message to include the unique identifier, forming a modified authorization request;

transmit the modified request message to an issuer system that issued the first payment device;

receive an authorization response message associated with the electronic payment transaction from the issuer system, wherein the authorization response message comprises second transaction data associated with the electronic payment transaction, the second transaction data comprising an authorization decision indicating that the electronic payment transaction is authorized;

store at least a portion of the first transaction data and the second transaction data in a database of the transaction processing system in association with the unique identifier for the electronic payment transaction;

transmit a response message comprising the unique identifier and the authorization decision to the acquirer system;

in real-time relative to transmitting the response message, receive a clearing request message including only the unique identifier associated with the electronic payment transaction and optionally updated first and/or second transaction data from the acquirer system;

in response to receiving the clearing request message, retrieve, from the database of the transaction processing system, the stored at least a portion of the first transaction data and the second transaction data associated with the unique identifier based on the unique identifier from the clearing request message;

automatically modify the clearing request message to include the retrieved at least a portion of the first transaction data and the second transaction data associated with the unique identifier, forming a modified clearing request; and initiate clearing of the electronic payment transaction between the issuer system and the acquirer system based on the modified clearing request.

5. The system of claim 4, wherein the clearing request message does not comprise transaction data associated with transactions other than the electronic payment transaction.

6. The system of claim 4, wherein the at least a portion of the first transaction data and the second transaction data stored by the database of the transaction processing system in association with the unique identifier for the electronic payment transaction comprises all transaction data required to clear the electronic payment transaction.

7. A computer program product comprising at least one non-transitory computer-readable medium including program instructions that, when executed by at least one processor of a transaction processing system, cause the at least one processor to:

receive an authorization request message associated with an electronic payment transaction from an acquirer system, wherein the authorization request message comprises first transaction data associated with the electronic payment transaction initiated by a first payment device;

generate a unique identifier associated with the electronic payment transaction;

automatically modify the authorization request message to include the unique identifier, forming a modified authorization request;

transmit the modified request message to an issuer system that issued the first payment device;

receive an authorization response message associated with the electronic payment transaction from the issuer system, wherein the authorization response message comprises second transaction data associated with the electronic payment transaction, the second transaction data comprising an authorization decision indicating that the electronic payment transaction is authorized;

store at least a portion of the first transaction data and the second transaction data in a database of the transaction processing system in association with the unique identifier for the electronic payment transaction;

transmit a response message comprising the unique identifier and the authorization decision to the acquirer system;

in real-time relative to transmitting the response message, receive a clearing request message including only the unique identifier associated with the electronic payment transaction and optionally updated first and/or second transaction data from the acquirer system;

in response to receiving the clearing request message, retrieve, from the database of the transaction processing system, the stored at least a portion of the first transaction data and the second transaction data associated with the unique identifier based on the unique identifier from the clearing request message;

automatically modify the clearing request message to include the retrieved at least a portion of the first transaction data and the second transaction data associated with the unique identifier, forming a modified clearing request; and initiate clearing of the electronic payment transaction between the issuer system and the acquirer system based on the modified clearing request.

8. The computer program product of claim 7, wherein the clearing request message does not comprise transaction data associated with transactions other than the electronic payment transaction.

9. The computer program product of claim 7, wherein the at least a portion of the first transaction data and the second transaction data stored by the database of the transaction processing system in association with the unique identifier for the electronic payment transaction comprises all transaction data required to clear the electronic payment transaction.

\* \* \* \* \*